Nov. 1, 1966 C. C. RABER ET AL 3,282,269

FILE CONSTRUCTION

Filed July 29, 1964

2 Sheets-Sheet 1

INVENTORS
Chauncey C. Raber and
Charles Norris Smith
BY
Frease, Bishop, Johns & Schick
ATTORNEYS INVENTORS
Chauncey C. Raber and
BY Charles Norris Smith
Frease, Bishop, Johns & Schick
ATTORNEYS 3,282,269
Patented Nov. 1, 1966

3,282,269
FILE CONSTRUCTION

Chauncey C. Raber and Charles Norris Smith, North Canton, Ohio, assignors to Diebold Incorporated, Canton, Ohio, a corporation of Ohio Filed July 29, 1964, Ser. No. 385,855
1 Claim. (Cl. 129—16)

Figure 1:
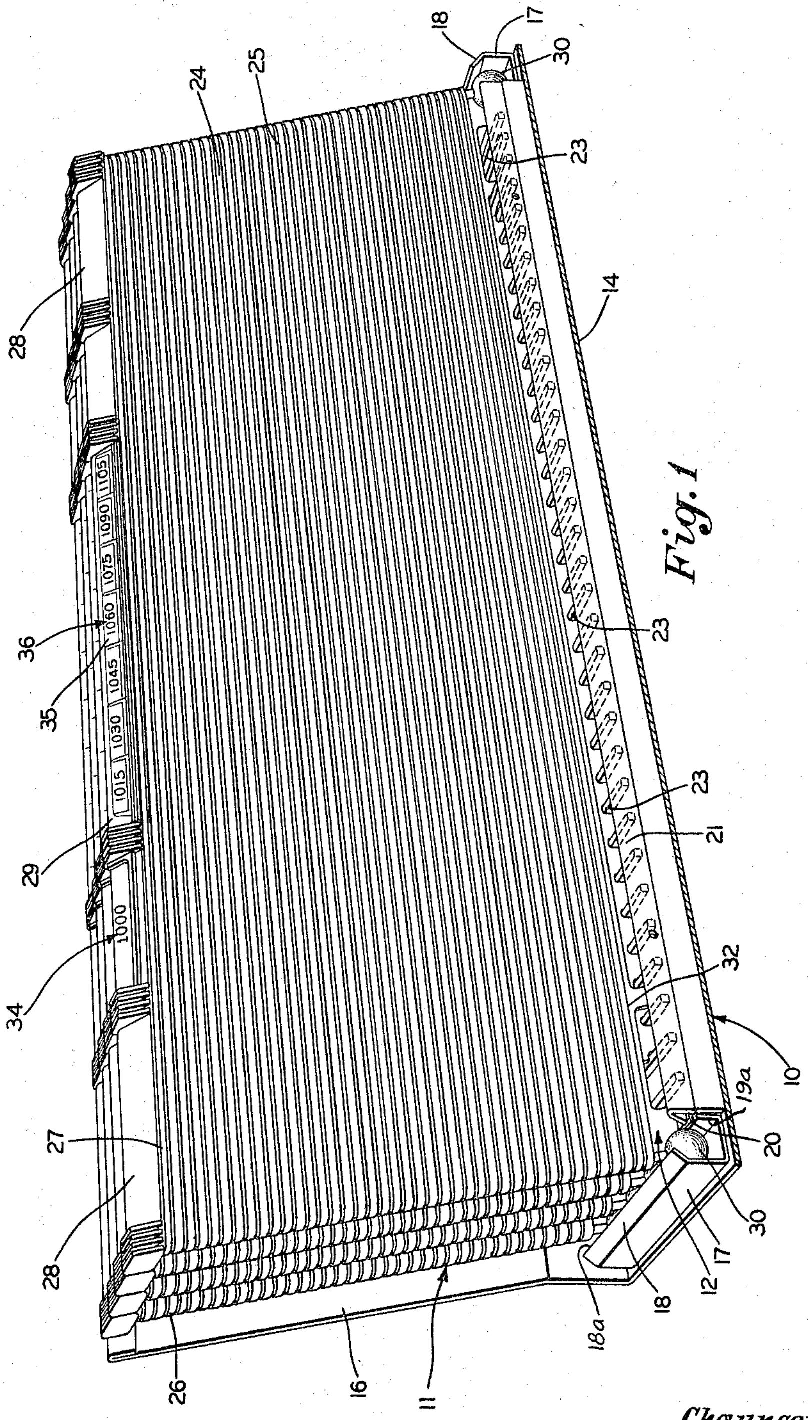

Our invention relates to improvements in file constructions, and more particularly to files of the visible record type. Even more specifically, our invention relates to improvements in the construction of the main separators and frames of visible record files, and the particular unique relationship between these separators and frames.

In visible record files it is usual practice to provide main separators serving for main category indexing, a series of intermediate dividers behind each of the main separators serving for intermediate indexing of the particular main category, and a series of record cards behind each of the intermediate dividers having further indexing relating to the intermediate indexing of that particular divider. Furthermore, most file constructions of this form have had the main separators constructed positioned upstanding in the file frame for limited forward and rearward pivotal movement, and also engaged in the file frame against complete removal without the selective operation of some form of disengagement means, whereas the intermediate dividers and record cards have usually been positioned merely resting edgewise on a surface of the file frame for the same limited forward and rearward pivotal movement and also complete removal from the file frame merely by lifting upwardly on these intermediate dividers and record cards.

For instance, one commonly used prior construction of main separator for visible record files has included cylindrical transversely outwardly extending pivot members on the lower corner portions of the separator received in the file frame so that the cylindrical surfaces of these pivot members mount the separator for the limited forward and rearward pivotal movement. Further, the outward extensions of these cylindrical pivot members are engaged by inwardly extending flanges on the file frame, which flanges normally overlie parts of these cylindrical extensions and, thereby, normally retain the separator against upward disengagement and removal from the file frame despite the pivotal movement of the separator.

Additionally, in these prior constructions, one of the separator retaining flanges on the file frame, or at least a portion thereof, has been formed for selective disengagement such as by selective pivoting from its position overlying that particular pivot member extension. Thus, for removal of the particular separator from the file frame, it is necessary to selectively pivot or disengage the particular frame flange from its position overlying the particular cylindrical pivot member of the separator, and then, by angling the separator upwardly so as to disengage that corner portion from the file frame, the separator can be completely removed.

One of the major difficulties with this prior form of visible record file construction is that a relatively complicated and expensive mechanism is required in order that such selective release of one of the separator corner portions may be provided. Also, not only must such release mechanism be inconveniently located and difficult to manipulate, as well as requiring an increased size of the file frame which takes up valuable filing space, but such release mechanisms necessarily require some form of springs and releasable latches which are subject to failure after a period of use and require replacement.

It is, therefore, a general object of the present invention to provide a file construction of the visible record type which overcomes the disadvantages of the prior constructions and solves the various difficulties encountered therewith.

It is a primary object of the present invention to provide a file construction of the visible record type in which the main separators thereof are pivotally engaged with the file frame in a new and unique manner.

It is a further object of the present invention to provide a file construction of the foregoing type in which the main separators are mounted in the file frame for the necessary limited forward and rearward pivotal movement, yet are relatively easily disengageable from the frame for complete removal without the necessity of requiring selectively operable spring latches for accomplishing such removal.

It is still a further object of the present invention to provide a file construction of the foregoing type in which the main separators are mounted in the file frame for the usual forwardly and rearwardly pivotal movement, are retained in the frame against disengagement during such pivotal movement, yet may be quickly disengaged and completely removed merely by inward transverse flexing of the main separators through a hand force.

It is an additional object of the present invention to provide a file construction of the foregoing type in which the main separators are mounted in the file frame for disengagement and complete removal merely by inward transverse flexing of the separators, and these separators are formed in a unique manner so as to provide strategic strengthening and prevent any possible total collapse of the separators during such flexing.

Finally, it is an object of the present invention to provide a file construction of the foregoing type which satisfies all of the above objects in a simple and efficient manner and may be provided at a minimum of cost.

These and other objects are accmplished by the parts, constructions, arrangements, combinations and subcombinations comprising the present invention, a preferred embodiment of which—illustrative of the best mode in which applicants have contemplated applying the principles—is set forth in the following description and illustrated in the accompanying drawings, and which is particularly and distinctly pointed out and set forth in the appended claims forming a part hereof.

In general terms, the file construction of the present invention may be stated as including a file frame and at least one upstanding transversely extending main separator. The main separator is formed with a transversely flexible main panel, preferably constructed of thin flexible sheet metal, such as aluminum, with this main panel having preferably plastic cap members at the upper edge thereof for main indexing and usual pivotal manipulation of the main separator.

Furthermore, the main separator panel is formed at lower corner portions thereof with pivot members, which pivot members are received in the main file frame for mounting the separator with limited forward and rearward pivotal movement. These panel pivot members are preferably metal balls having upwardly extending stems formed thereon, with the ball stems preferably being received secured upwardly into downwardly opening curled edges of the panel so as to present arcuate surfaces resting on the file main frame accomplishing the limited pivotal movement, and at the same time, presenting outwardly extending arcuate engagement surface portions extending outwardly of the ball stems and preferably outwardly of the panel edges.

The file main frame is formed with inwardly extending flange means preferably in the form of upwardly and inwardly angling flanges positioned extending along and inwardly over the outwardly extending engagement portions of each of the separator panel balls, thereby retaining the main separator against upward disengagement and removal from the main frame, while still permitting the pivotal movement of the separator in the frame. Further, when it is desired to remove the main separator from the file main frame, it is merely necessary to apply an inward transverse hand force to the separator causing transverse flexing of the separator main panel, which will move one of the panel lower corner portions inwardly to disengage that corner portion pivot member or ball from that particular frame flange, so that the separator may be moved angularly upwardly for disengagement and complete removal of the separator from the frame.

The file main frame may be further formed with an elevated divider and record card platform which extends within the frame spaced transversely inwardly from at least one of the separator pivot or ball members and extending transversely between these separator ball members. Finally, the plane of extension of the frame raised platform may be generally aligned with the centers of the separator ball members so that intermediate dividers and record cards positioned edgewise on the frame platform will pivot forwardly and rearwardly about the same general plane as the main separator.

Figure 6:
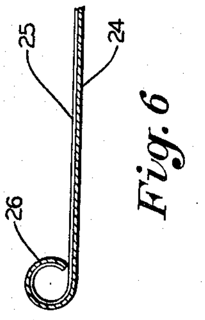
Figures 2, 3, 4, 5:
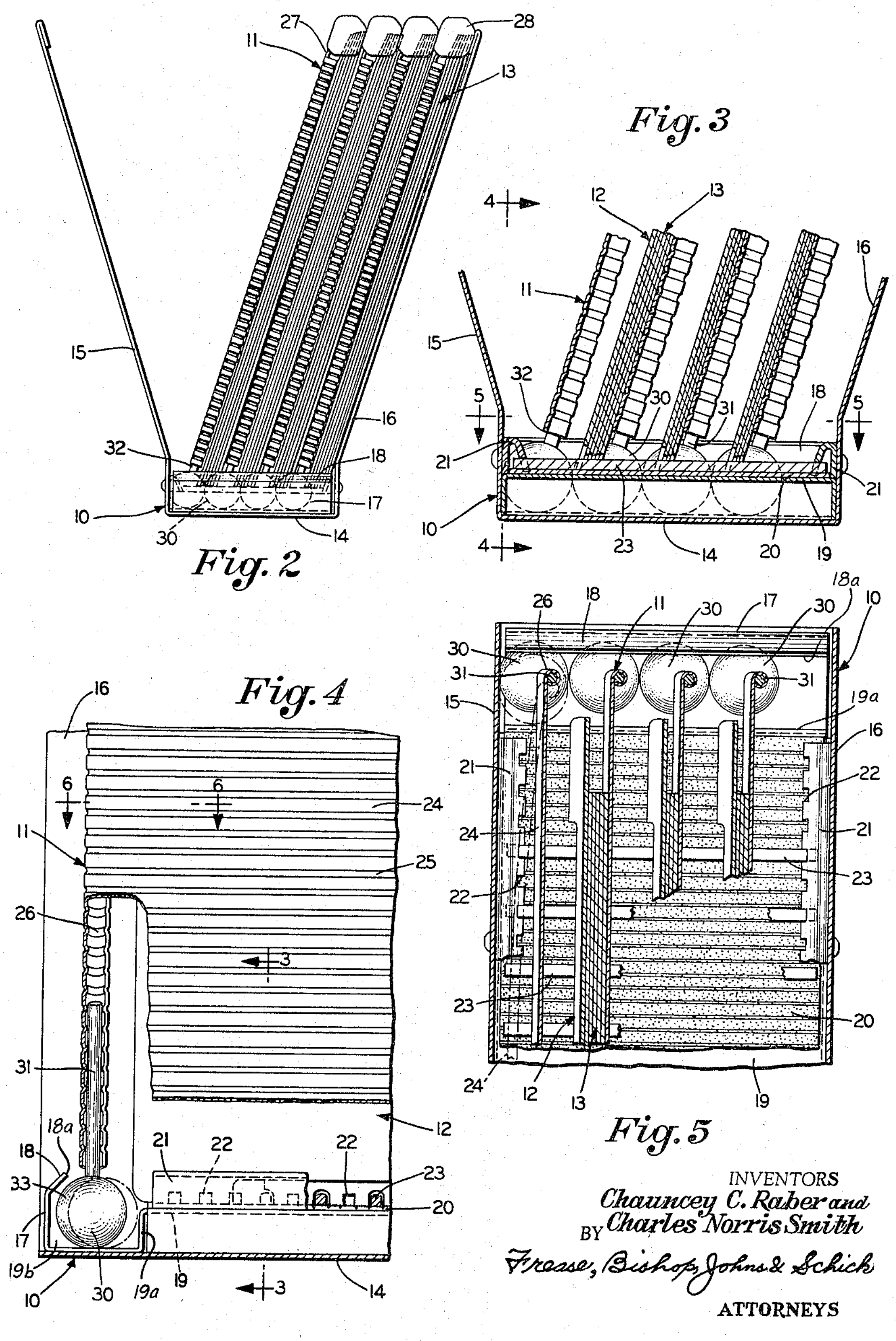

By way of example, an embodiment of the visible record file construction of the present invention is illustrated in the accompanying drawings forming a part hereof, wherein like numerals indicate similar parts throughout the several views, and in which:

FIG. 1 is a front-side perspective view, with the main frame front wall removed and the bottom wall thereof shown in section, of a visible record file construction incorporating the improvements of the present invention;

FIG. 2, a side elevation of the file construction of FIG. 1;

FIG. 3, an enlarged fragmentary sectional view, part in elevation, looking in the direction of the arrows 3—3 in FIG. 4;

FIG. 4, a fragmentary sectional view, with parts in elevation and parts broken away, looking in the direction of the arrows 4—4 in FIG. 3;

FIG. 5, a fragmentary sectional view, with parts in elevation and parts broken away, looking in the direction of the arrows 5—5 in FIG. 3, and FIG. 6, an enlarged fragmentary sectional view, part in elevation, looking in the direction of the arrows 6—6 in FIG. 4.

Referring to the drawing, the embodiment of the visible record file construction illustrating the principles of the present invention includes a file main frame, generally indicated at 10, main separators, generally indicated at 11, intermediate dividers, generally indicated at 12, and record cards, generally indicated at 13. It is pointed out at the onset that the inventions of the present application reside in the unique constructions and relationships between the main separators 11 and the file main frame 10, and deal only incidentally with the intermediate dividers 12 and record cards 13, so that only the main separators and file main frame will be described in detail and a more complete description of the remainder of the construction is included in the co-pending application," Serial No. 356,604, filed April 1, 1964, now Pat. No. tion," Seral No. 356,604, filed Aprl 1, 1964, now Pat. No. 3,245,412. Furthermore, in view of the fact that all of the main separators 11, intermediate dividers 12 and record cards 13 are substantially identical in their individual groups, a description of one of each will suffice for all.

The file frame 10 is preferably formed of metal such as sheet steel, and includes a flat bottom wall 14, an upwardly extending, preferably forwardly angled, front wall 15 and an upwardly extending, preferably rearwardly angled, back wall 16. Further, short upstanding end walls 17 are formed on the frame at 10 at each side of the frame extending from front to back between the front and back walls 15 and 16 and upwardly from the bottom wall 14.

Still further, short inwardly and upwardly angled flange portions 18 terminating at inner edges 18*a* are formed along each of the upper edges of the end walls 17, as best seen in FIG. 4, which flange portions are of vital importance to the principles of the present invention, as will be hereinafter discussed more in detail. Finally, the frame end walls 17 may be formed as integral units with the frame raised platform 19, which platform extends parallel to but spaced above the frame bottom wall 14, with the extremities or end walls 19*a* of this platform being spaced laterally inwardly from the frame end walls 17.

Thus, the unit forming the complete end wall 17 and raised platform 19 may extend from the plane of the raised platform 19 at the extremities or end walls 19*a* thereof downwardly to the bottom wall 14 and transversely along the bottom wall 14 to the end walls 17. The unit forming the spaced frame and platform end walls 17 and 19*a*, thus forms pivot channels 19*b* extending from front to back of the frame along end walls 17 and having the flange portions 18 laterally overhanging the channels 19*b* along the end walls 17. Also, this unit may extend at the forward extremities of the platform 19 downwardly along the front wall 15 to the bottom wall 14 and extend at the rearward extremities of the platform downwardly along the back wall 16 to the bottom wall 14. With this construction, therefore, the end wall 17 and raised platform 19 may be formed and assembled as a single unit which is merely inserted downwardly with proper transverse positioning into the file frame 10 against the bottom wall 14 and forwardly and rearwardly between the front and back walls 15 and 16.

A preferably soft cloth mat 20 is positioned over the frame raised platform 19, as best seen in FIGS. 3 and 5. Further, inverted generally V-shaped holders 21 are positioned along the forward and rearward extremities of platform 19 against the front and back walls 15 and 16 and are preferably secured thereto as shown. Such holders 21 are formed with transversely spaced openings 22 for receiving the ends of the usual transversely spaced forwardly and rearwardly extending divider and record card positioning bars 23 overlying the mat 20.

Each of the main separators 11 is formed with a transversely flexible main panel 24, preferably thin flexible sheet of aluminum which is formed with the transverse ribs 25 to provide rigidity while still maintaining transverse flexibility. Each of the ends of the main panel 24 is preferably transversely rolled or curled rearwardly forming the stiffened downwardly opening end edge portions 26, as best seen in FIGS. 4 and 6.

The upper edge 27 of main panel 24 is formed with preferably thickened plastic cap members, such as the end cap members 28 and central transparent cap member 29. The mounting and functioning of these cap members 28 and 29 is described more in detail in said Pat. No. 3,245,412.

Pivot members in the form of the balls 30 having the upwardly extending stems 31, preferably both formed of metal, are positioned at the bottom corners of the main panel 24 between the lower panel edge 32 and the panel end edges 26, with the ball stems 31 received upwardly telescoped into the panel curled edge portions 26 and with the balls 30 spaced slightly downwardly from the panel lower edge 32. The ball stems 31 may be secured in the panel curled edge portions 26 in any usual manner, such as by slightly crimping these edge portions 26 against the surfaces of the stems 31.

Most important to the principles of the present invention is the fact, as best seen in FIG. 4, that the balls 30 extending outwardly from the stems 31 at each side of the main panel 24 presenting the outwardly extending arcuate or spherical surface portions 33 underlying and engageable with the flanges 18. Furthermore, in the particular embodiment shown, since the ball stems 31 are telescoped upwardly into the panel edge portions 26, these spherical surface portions 33 likewise extend outwardly of the panel edge portions 26 and other spherical portions of each ball 30 extend forwardly and rearwardly of the separator panel as shown in FIGS. 3 and 5.

Each of the main separators 11 is positioned in the file frame 10 with the balls 30 received in the pivot channels 19*b* between the transverse extremities of the raised platform 19 and the frame end walls 17, and the transverse dimensions of the separator main panel 24 are such as to position these balls 30 with arcuate surface positions 33 thereof at least partially underlying the flange portions 18 of the frame end walls 17. In this manner, these flange portions 18 normally obstruct upward movement of the panel balls 30, thereby normally obstructing upward disengagement of the main separator 11 from the file frame 10.

Thus, the panel balls 30, in view of the location of arcuate or spherical surfaces thereof, pivotally mount the main separators 11 in the file frame 10 in upstanding position and for limited forward and rearward pivotal movement, yet, in view of the cooperation between the ball engagement surface portions 33 and the flange portions 18 of the file frame end walls 17, these main separators are obstructed against upward disengagement from the file frame 10 without disturbing such separator pivotal movement.

It will be further noted that the positioning between the frame end walls 17 and the frame raised platform 19 is such that the transverse distance between the end walls 17 and raised platform end walls 19*a* is greater than the diameter of the balls 30 and thus is sufficient to permit transverse inward movement of preferably either of the balls 30 sufficient so that the ball engagement surface portions 33 are no longer upwardly obstructed by the flange portions 18 of the frame end walls 17. In other words, preferably each of the end walls 19*a* of the raised platform 19 is spaced transversely inwardly from the balls 30, when these balls are in their normal positions, so as to permit the forgoing transverse inward movement of the balls. As show in FIGS. 4 and 5 the lateral spacing between the inner edges 18*a* of flanges 18 and platform end walls 19*a* is approximately equal to the diameter of the pivot balls 30.

Thus, when the main separators 11 are normally positioned in upstanding positions in the file frame 10, the main panel 24 of any one of these main separators may be transversely inwardly flexed, as shown in broken lines in FIG. 5, merely by applying a transverse inward hand force against the panel edge portions 26 of the separator, to thereby move at least one of the balls 30 transversely inwardly to the position shown in broken lines in FIGS. 4 and 5. Thereafter, it is only necessary to upwardly angle the particular main separator 11, moving the particular ball 30 upwardly through the space between the flange inner edge 18*a* and the platform end wall 19*a* and completely disengaged from the file frame 10, to thereby provide complete removal of the main separator from the file frame.

As probably best seen in FIG. 1, due to the downward extension of the main panel balls 30 and stems 31 of the main separators 11, the lower edges 32 of these separator panels 24 are positioned spaced above the frame raised platform 19, mat 20 and positioning bars 23, so as to permit the free forward and rearward pivotal movement of the main separators 11 in the file frame 10. Further, as shown briefly in FIGS. 2 through 5, a series of intermediate dividers 12 may be positioned behind each of the main separators 11 and a series of transversely offset record cards 13 may be positioned behind each of the intermediate dividers 12 as is usual in files of this form. Furthermore, these intermediate dividers 12 and record cards 13 rest edgewise on mat 20 of the frame raised platform 19 for forward and rearward pivotal movement with the main separators 11 and are engaged against transverse shifting by the positioning bars 23 in usual manner.

Of importance to the present invention, however, is the fact that, as best seen in FIGS. 1 through 4, the plane of extension of the frame raised platform 19 is substantially transversely aligned with the centers of the main panel balls 30 of main separators 11. Thus, in view of the fact that the intermediate dividers 12 and record cards 13 rest edgewise on the frame raised platform 19, these intermediate dividers and record cards will pivot forwardly and rearwardly about substantially the same plane as the main separators 11, thereby creating a minimum of upward and downward movement between the main separators, intermediate dividers and record cards during such pivotal movement.

Finally, the main separators 11 may be provided with the usual main indexing shown, for instance, at 34 and the intermediate dividers 12 may be provided with the usual upwardly projecting tabs 35 having the usual intermediate indexing thereon, as shown for instance at 36. Also, the record cards 13 may have even further indexing (not shown) falling between the intermediate indexing 36 of the particular intermediate dividers 12, all provided for the usual proper use of the file construction.

Thus, according to the principles of the present invention, a file construction of the visual record type is provided incorporating a unique structural relationship between the main separators 11 and file frame 10 which permits normal pivotal mounting of the main separators in the file frame and normal securement of these main separators against upward disengagement thereof from the file frame, yet such upward disengagement may be selectively accomplished merely by a transverse inward flexing of any one of the main separators 11 by a simple hand force, completely eliminating the necessity of providing the file frame 10 with the complicated spring latches heretofore necessary. Furthermore, in view of the unique structural features of the main separators 11 described in the foregoing and the particular relationship of these separator structural features with cooperating structural features of the file frame 10, a file construction of the visual record type is provided having the many previously discussed advantages over the prior constructions and which may be not only used with the maximum of efficiency, but may be fabricated and provided at a minimum of cost.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful construction and reasonable mechanical equivalents thereof obvious to those skilled in the art are set forth in the appended claim.

We claim:

In visible record file construction of the type in which separators serving for main category indexing are mounted for limited forward and rearward pivotal movement in a frame; the combination of a frame having a bottom wall, upstanding end walls on the bottom wall, each end wall terminating in an inwardly angled flange having an inner edge, a raised platform on the frame provided with end walls, the platform end walls being spaced laterally inwardly from the frame end walls, the frame bottom wall and frame and platform end walls forming pivot channels extending from front to back of the frame along said end walls with the flanges laterally overhanging portions of said channels along the frame end walls; a separator having a flexible main panel provided with a lower edge, end edges and bottom corners between the lower and end edges; a pivot ball having a stem mounted on the panel extending downwardly of the panel end edge at each panel bottom corner with the ball spaced below the lower panel edge, each ball having a spherical surface portion located laterally outwardly of the panel end edge from which the ball stem projects, each ball having other spherical surface portions projecting forwardly and rearwardly of the separator panel; the pivot balls normally being located in the pivot channels pivotally mounting the separator in the frame, the lateral width of the channels between the frame and platform end walls being greater than the diameter of the pivot balls, the lateral spacing between the flange inner edges and the platform end walls being approximately equal to the diameter of said pivot balls, and the spacing between the balls at the bottom corners of the separator being such that surface portions of the balls located laterally outwardly of the panel end edges normally underlie the flanges; and the separator being releasable from the frame by flexing the separator to decrease the spacing between the balls at the bottom corners of the separator to permit the balls to be withdrawn from the channels through the lateral spacing between the flange inner edges and the platform end walls.

References Cited by the Examiner

UNITED STATES PATENTS

| | | | |
|---|---|---|---|
| 2,435,077 | 1/1948 | Hall et al. | 129—16 |
| 2,550,117 | 4/1951 | Hall | 129—16 |
| 3,102,542 | 9/1963 | Logan | 129—16 |

FOREIGN PATENTS

| | | |
|---|---|---|
| 499,437 | 12/1950 | Belgium |
| 981,369 | 1/1951 | France. |
| 1,129,238 | 9/1956 | France. |
| 426,996 | 4/1935 | Great Britain. |
| 661,455 | 11/1951 | Great Britain. |
| 670,738 | 4/1952 | Great Britain. |

JEROME SCHNALL, *Primary Examiner.*